(12) United States Patent
Baccouche et al.

(10) Patent No.: US 10,071,701 B1
(45) Date of Patent: Sep. 11, 2018

(54) VEHICLE ROLLOVER SAFETY SYSTEM

(71) Applicant: FORD GLOBAL TECHNOLOGIES, LLC, Dearborn, MI (US)

(72) Inventors: Mohamed Ridha Baccouche, Ann Arbor, MI (US); Horst Heribert Lanzerath, Bad Muenstereifel (DE); Rahul Arora, Birmingham, MI (US); Guosong Li, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/451,976

(22) Filed: Mar. 7, 2017

(51) Int. Cl.
| | |
|---|---|
| *B60R 21/13* | (2006.01) |
| *B60R 21/0134* | (2006.01) |
| *B60R 21/017* | (2006.01) |
| *B62D 25/06* | (2006.01) |
| *B32B 17/10* | (2006.01) |
| *B60R 21/00* | (2006.01) |
| *B60R 21/01* | (2006.01) |

(52) U.S. Cl.
CPC ........ *B60R 21/13* (2013.01); *B32B 17/10752* (2013.01); *B60R 21/017* (2013.01); *B60R 21/0134* (2013.01); *B62D 25/06* (2013.01); *B60R 2021/0018* (2013.01); *B60R 2021/01013* (2013.01)

(58) Field of Classification Search
CPC ........ B60R 2021/137; B60R 2021/132; B60R 21/13
See application file for complete search history.

(56) References Cited

U.S. PATENT DOCUMENTS

| | | | | | |
|---|---|---|---|---|---|
| 2,929,637 | A | * | 3/1960 | Papacosta | B60N 2/4221 180/274 |
| 4,801,174 | A | * | 1/1989 | Hirshberg | B60J 7/047 296/106 |
| 5,056,816 | A | * | 10/1991 | Lutze | B60R 21/13 280/751 |
| 5,588,694 | A | * | 12/1996 | Koehr | B60R 21/13 280/756 |

(Continued)

FOREIGN PATENT DOCUMENTS

| | | | | |
|---|---|---|---|---|
| DE | 102009054009 A1 | * | 6/2010 | ........... H01Q 1/3275 |
| DE | 102010055987 A1 | * | 8/2011 | ............. B60R 21/13 |

(Continued)

OTHER PUBLICATIONS

The Story of Firebird II, "Three-Zero-Four", the Gas Turbine Family Car, General Motors latest "Laboratory on Wheels", General Motors, 9 pages.

(Continued)

*Primary Examiner* — Nicole T Verley
(74) *Attorney, Agent, or Firm* — Jason Rogers; Brooks Kushman P.C.

(57) ABSTRACT

A vehicle includes a body, door, glass dome, and dynamic pillars. The body defines a cabin and has first and second static pillars. The door that accesses the cabin, is secured to the body, and is disposed between the first and second static pillars. The glass dome is secured to the body over the entirety of the cabin. The dynamic pillars are extendable in an upward direction and are secured to the body proximate to an outer perimeter of the glass dome.

19 Claims, 2 Drawing Sheets

(56) References Cited

U.S. PATENT DOCUMENTS

| | | | | |
|---|---|---|---|---|
| 6,129,413 | A  * | 10/2000 | Klein | B60J 7/047 296/214 |
| 6,764,124 | B2 * | 7/2004 | Tohda | B60R 21/13 280/756 |
| 6,793,277 | B2 | 9/2004 | Chon et al. | |
| 6,988,744 | B2 * | 1/2006 | Muller | B60R 21/13 280/756 |
| 7,407,188 | B2 * | 8/2008 | Wildig | B60R 21/13 180/271 |
| 7,494,178 | B2 * | 2/2009 | Nygaard | B60R 21/13 180/274 |
| 7,611,189 | B2 * | 11/2009 | Nielander | B60J 7/047 296/107.2 |
| 7,641,269 | B2 * | 1/2010 | Matsumoto | B62D 25/04 280/756 |
| 7,654,569 | B2 * | 2/2010 | Nelson | B60R 21/13 280/756 |
| 7,744,125 | B2 * | 6/2010 | Tang | B60N 2/4242 280/756 |
| 7,871,107 | B2 * | 1/2011 | Vlahovic | B62D 25/08 280/756 |
| 7,946,623 | B2 * | 5/2011 | Pedersen | B60R 21/13 280/756 |
| 8,322,749 | B2 * | 12/2012 | Srabstein | B60R 21/13 280/756 |
| 8,419,062 | B2 * | 4/2013 | Landini | B60R 21/13 180/274 |
| 8,439,434 | B2 * | 5/2013 | Newberg | B60J 7/04 296/218 |
| 8,662,534 | B2 * | 3/2014 | Beki | B60R 21/13 280/756 |
| 9,151,578 | B2 * | 10/2015 | Enzmann | B60R 21/13 |
| 9,266,413 | B2 * | 2/2016 | Engler | B60J 5/047 |
| 2008/0203717 | A1 * | 8/2008 | Helsper | B60R 21/13 280/756 |
| 2008/0309126 | A1 * | 12/2008 | Beierl | B60J 1/1823 296/216.01 |
| 2009/0278342 | A1 * | 11/2009 | Browne | B60R 21/13 280/756 |
| 2010/0171296 | A1 * | 7/2010 | Rohner | B60R 21/13 280/748 |
| 2011/0204609 | A1 * | 8/2011 | Gad Elkariem | B60R 21/13 280/755 |
| 2011/0204682 | A1 * | 8/2011 | Kamei | B60J 7/0015 296/216.04 |
| 2018/0009389 | A1 * | 1/2018 | Gutierrez Gaspar | B60R 9/045 |

FOREIGN PATENT DOCUMENTS

| | | | | |
|---|---|---|---|---|
| DE | 102014009760 | A1 * | 2/2015 | B60R 21/13 |
| DE | 102015105221 | A1 * | 10/2015 | B60R 21/13 |
| DE | 102015001659 | A1 * | 8/2016 | B60R 21/13 |
| EP | 2660105 | A1 * | 11/2013 | B60R 21/13 |
| EP | 2980004 | A1 * | 2/2016 | B60J 7/165 |
| FR | 2912975 | B1 * | 1/2010 | B60R 21/13 |
| FR | 2901185 | B1 * | 2/2011 | B60J 1/183 |
| GB | 961121 | A  * | 6/1964 | B60R 21/13 |
| GB | 2391896 | B | 4/2007 | |

OTHER PUBLICATIONS

Beatnik Custom Pictures, http://www.celebritycarsblog.com/celebrity/barry-weiss/, 2 pages.

* cited by examiner

VEHICLE ROLLOVER SAFETY SYSTEM

TECHNICAL FIELD

The present disclosure relates to vehicles and more particularly to vehicle safety systems.

BACKGROUND

Vehicle body structures provide structural support including components configured to provide protection to vehicle passengers during impact events.

SUMMARY

A vehicle includes a body, door, glass dome, and dynamic pillars. The body defines a cabin and has first and second static pillars. The door accesses the cabin, is secured to the body, and is disposed between the first and second static pillars. The glass dome is secured to the body over the entirety of the cabin. The dynamic pillars are extendable in an upward direction and are secured to the body proximate to an outer perimeter of the glass dome.

A vehicle includes a body, glass dome, dynamic pillars, and controller. The body defines a cabin. The glass dome is secured to the body over the entirety of the cabin. The dynamic pillars are extendable in an upward direction via an actuator and are secured to the body proximate to an outer perimeter of the glass dome. The controller is programmed to, in response to a trigger condition, activate the actuator to extend the dynamic pillars.

A vehicle includes a body, plurality of doors, and dynamic pillars. The body defines a cabin and has a set of static pillars. The plurality of doors accesses the cabin, is secured to the body, and is disposed between adjacent static pillars. The dynamic pillars are disposed within at least one of the static pillars and are extendable in an upward direction.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
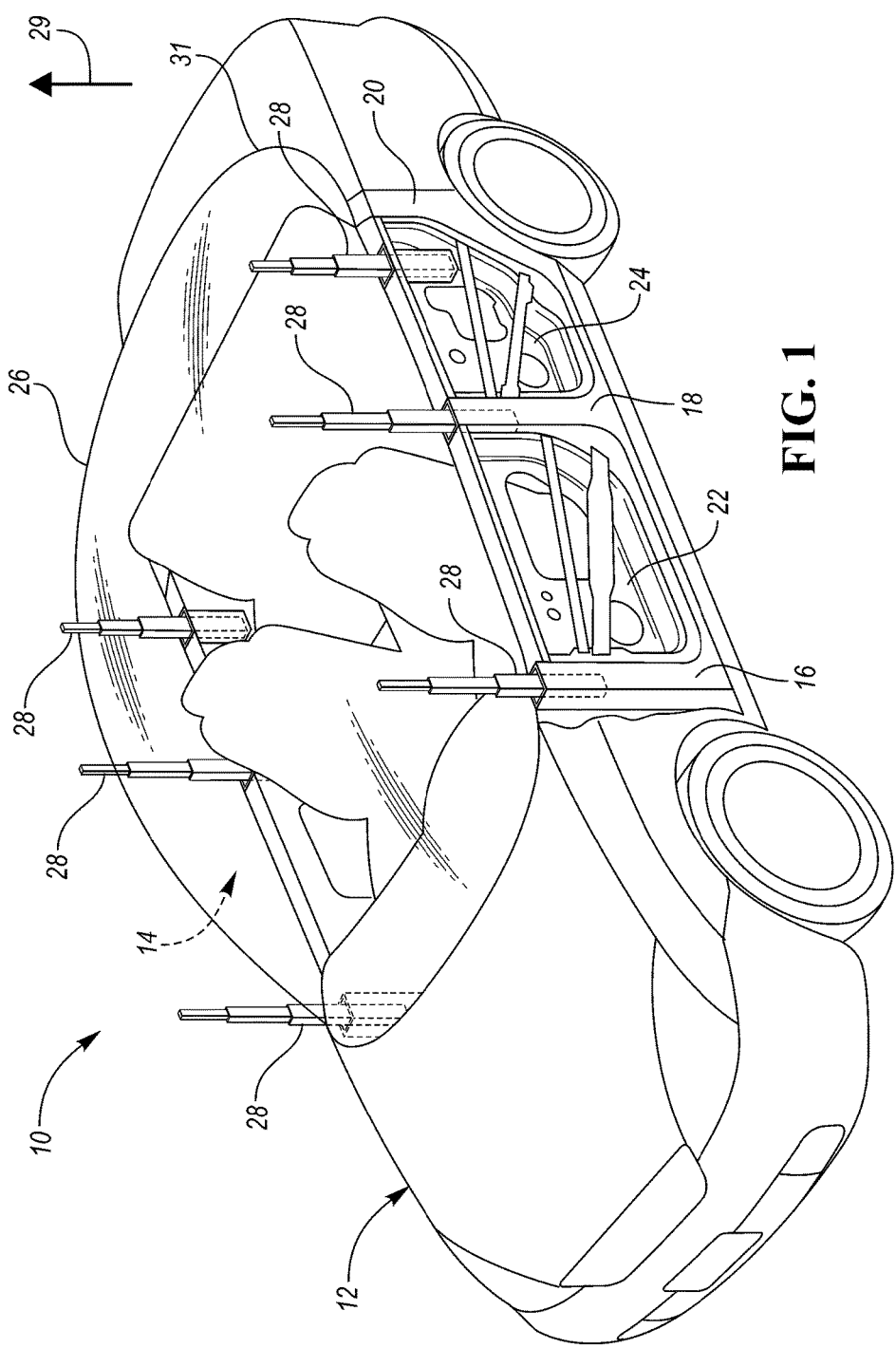
FIG. 1 is a side perspective view of a vehicle.

Referring to FIG. 1, a perspective side view of a vehicle 10 is illustrated. The vehicle 10 includes a body 12 the defines a cabin (or passenger compartment) 14. The body 12 includes the plurality (or set of) structural pillars. The structural pillars may also be referred to as static pillars. The body 12 may include a first static pillar 16, second static pillar 18, and third static pillar 20. The vehicle 10 may include a first door 22 that is rotatably secured to the body 12 and is configured to provide access to the cabin 14 when in an opened position. The first door 22 may be disposed between the first static pillar 16 and the second static pillar 18. The vehicle 10 may include a second door 24 that is rotatably secured to the body 12 and is also configured to provide access to the cabin 14 when in an opened position. The second door 24 may be disposed between the second static pillar 18 and the third static pillar 20. The exterior panels of both the first door 22 and second door 24 have been removed for illustrative purposes. In the alternative, it may be stated that the vehicle 10 includes a plurality of doors that provide access to the cabin 14, each door being secure to the body 12 and disposed between adjacent static pillars.

The first static pillar 16, second static pillar 18, third static pillar 20, first door 22, and second door 24 are shown to be on the driver side of the vehicle 10. It should be understood, however that the passenger side of the vehicle may also include a first static pillar, second static pillar, third static pillar, first door, and second door that are mirror images of and perform similar functions as the first static pillar 16, second static pillar 18, third static pillar 20, first door 22, and second door 24, respectively.

The vehicle 10 may also include a glass dome 26 that is secured to the body 12 over the entirety of a top of the cabin 14. The glass dome 26 may be comprised of safety glass that consists of alternating layers of glass and plastic. More specifically, glass dome 26 may be comprised polycarbonate laminated glass which consists of alternating layers of glass sheets and polycarbonate plastic sheets. The safety glass that comprises the glass dome 26 may include a single layer of glass sandwiched between two plastic layers. Alternatively, the safety glass that comprises the glass dome 26 may be bulletproof glass that consists of at least eight alternating layers of glass and plastic.

The vehicle 10 may also include a plurality of dynamic pillars 28 that are extendable in an upward direction 29. The dynamic pillars 28 may be secured to the body proximate to an outer perimeter 31 of the glass dome 26. The dynamic pillars 28 may be configured to extend upward beyond the top of the glass dome 26 in the event of a rollover accident in order to bear the weight of the vehicle 10, effectively preventing the glass dome 26 from bearing the weight of the vehicle 10. The first static pillar 16, second static pillar 18, and third static pillar 20 (or the plurality of static pillars) may define internal cavities. For example, the static pillars may be made from a sheet metal material that defines an internal cavity when formed. A first of the dynamic pillars 28 may be disposed within an internal cavity defined by the first static pillar 16. A second of the dynamic pillars 28 may be disposed within an internal cavity defined by the second static pillar 18. The first door 22 and second door 24 may also define internal cavities. For example, the doors may have an internal loadbearing structures made up of several members that are disposed within cavities defined between internal and external sheet metal panels of each door. A third of the dynamic pillars 28 may also be disposed within a cavity between internal and external sheet metal panels of the second door 24. It should be understood that the configuration of the dynamic pillars 28 described above may be implemented both on the driver and passenger sides of the vehicle 10, with the configurations on each side of the vehicle being mirror images with respect to each other.

Figure 2:
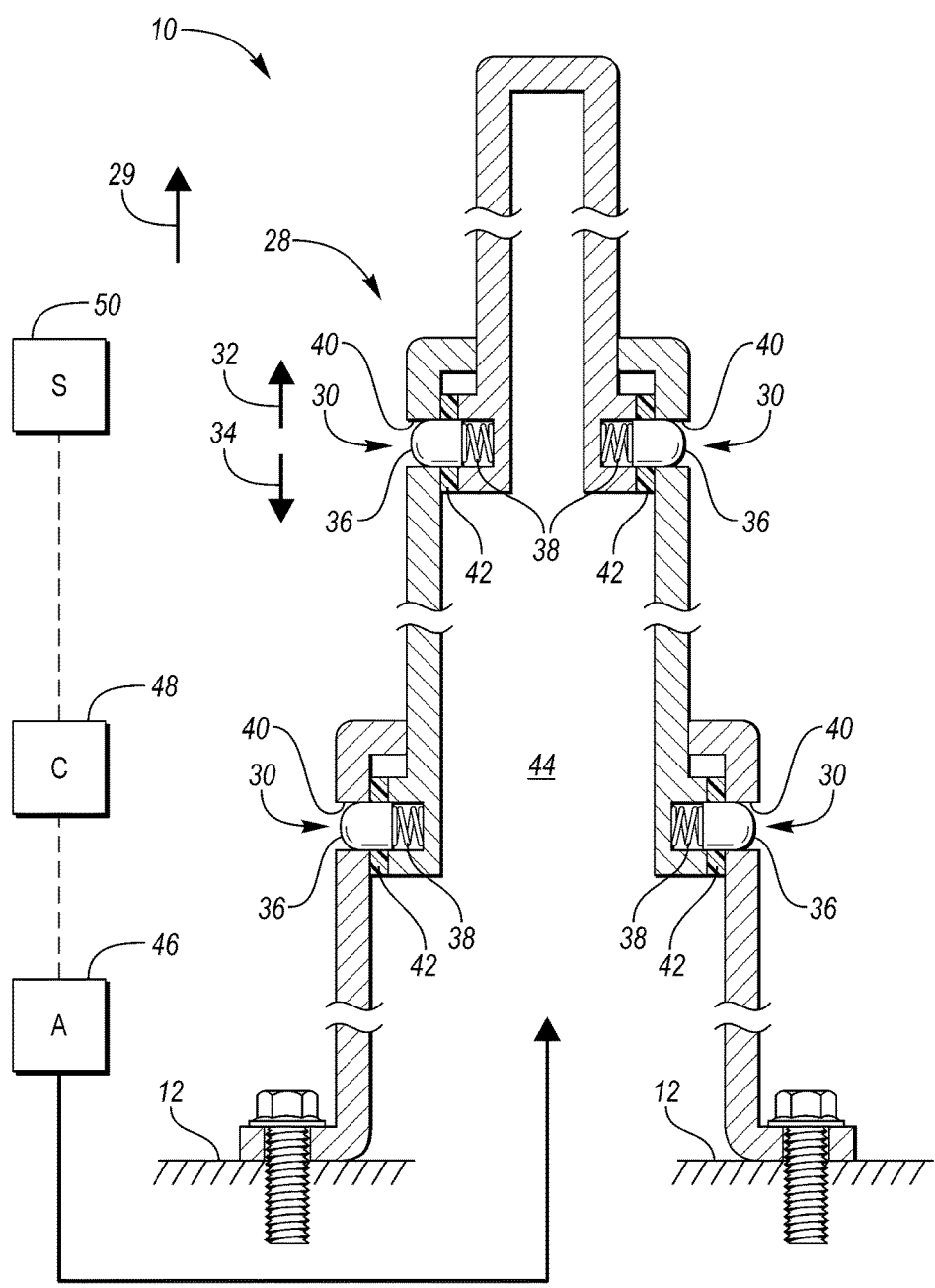
FIG. 2 is a subsystem of the vehicle that includes dynamic pillars and a deployment system for the dynamic pillars.

Referring to FIG. 2, a subsystem of the vehicle 10 that includes the dynamic pillars 28 and a deployment system for the dynamic pillars 28 is illustrated. It should be noted that the single dynamic pillar 28 illustrated in FIG. 2 may be representative of all the dynamic pillars 28. The dynamic pillar 28 is shown to be a telescoping mechanism that includes a series of latches 30 that secure individual sections of the telescoping mechanism into position when the dynamic pillar 28 is in an extended position. It should be noted that the proportion sizes of the individual sections of the telescoping mechanism may be inaccurate in FIG. 2 for illustrative purposes. For example, individual sections of the telescoping mechanism may be narrower and/or longer than depicted in FIG. 2. The dynamic pillar 28 is shown as a cross-section in FIG. 2 to illustrate the telescoping and latching mechanisms. The direction of extension of the dynamic pillar 28 is illustrated by arrow 32. It should be noted that the direction of extension may be the same of the as the upward direction 29 depicted in FIG. 1. The direction of retraction of the dynamic pillars 28 is illustrated by arrow 34. A lower section of the dynamic pillar 28 may be fixedly secured to the vehicle body 12. The latches 30 may include spring-loaded pins 36 that are secured to each section of the telescoping mechanism via springs 38. The spring-loaded pins 36 may be configured to engage orifices 40 defined by adjacent sections of the telescoping mechanism in order to secure the dynamic pillar 28 in the extended position. The individual sections of the telescoping mechanism may include seals 42 that are configured to prevent gaseous materials from flowing from an internal cavity 44 defined by the dynamic pillar 28 to the external space surrounding the dynamic pillar 28.

Although the dynamic pillar 28 is shown to be a telescoping mechanism and the latching mechanism is shown to be a spring-loaded pin 36 that engages in orifice 40, it should be understood that the dynamic pillars 28 may be any type of mechanism that is extendable and the latching mechanism may be any type of latching mechanism known in the art. For example, the dynamic pillars 28 may be comprised of a piston and cylinder combination while the latching mechanism is a spring-loaded ring (similar to a compression ring connected to a piston in an internal combustion engine) that engages a groove defined within the cylinder when the piston is in an extended position.

The vehicle 10 may include an actuator 46 that is configured to extend the dynamic pillar 28 in the direction of extension 32 and/or the upward direction 29. The actuator 46 may comprise a gas generator that is configured to direct the gaseous material to the dynamic pillar 28 in order to extend the dynamic pillar 28 in the direction of extension 32 and/or the upward direction 29. More specifically, the gas generator may be configured to direct the gaseous material into the internal cavity 44 defined by the dynamic pillar 28. The gas generator may be a pump that directs a gaseous material into the cavity 44, a pressure vessel/valve combination that releases a pressurized gaseous material into the cavity 44, or a system that directs gaseous material into the cavity 44 via pyrotechnics or a chemical reaction (similar to the mechanism that causes an airbag in an automatable to inflate).

The vehicle 10 may include a controller 48 that is configured to activate the actuator 46 in response to a trigger condition. The trigger condition may be an imminent roll over condition of the vehicle 10. An imminent roll over condition may be a condition where it has been determined that the vehicle 10 will likely roll over within five seconds or less. The vehicle 10 may include a sensor 50 that is configured to detect various conditions of the vehicle 10 that are indicative of an imminent roll over and communicate the various conditions to the controller 48. For example, the sensor 50 may be configured to detect a loss of load bearing weight on one or more of the vehicle's tires or an undesirable acceleration of the vehicle 10 in a particular direction. More specifically, the sensor 50 may be an accelerometer that is configured to detect a lateral acceleration of the vehicle 10 and communicate the lateral acceleration of the vehicle 10 to the controller 48. The controller 48 may then be programmed to activate the actuator 46 in order to extend the dynamic pillars 28 in response to the lateral acceleration of the vehicle 10 exceeding a predetermined threshold that corresponds to an imminent roll over of the vehicle 10.

While illustrated as one controller, the controller 48 may be part of a larger control system and may be controlled by various other controllers throughout the vehicle 10, such as a vehicle system controller (VSC). It should therefore be understood that the controller 48 and one or more other controllers can collectively be referred to as a "controller" that controls various actuators in response to signals from various sensors to control functions the vehicle 10 or vehicle subsystems. The controller 48 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 48 in controlling the vehicle 10 or vehicle subsystems.

Control logic or functions performed by the controller 48 may be represented by flow charts or similar diagrams. These diagrams may provide representative control strategies and/or logic that may be implemented using one or more processing strategies such as event-driven, interrupt-driven, multi-tasking, multi-threading, and the like. As such, various steps or functions may be performed in an illustrated sequence, in parallel, or in some cases omitted. One of ordinary skill in the art will recognize that one or more of the steps or functions may be repeatedly performed depending upon the particular processing strategy being used. Similarly, an order of processing is not necessarily required to achieve the features and advantages described herein, but may be provided for ease of illustration and description. The control logic may be implemented primarily in software executed by a microprocessor-based vehicle controller, such as controller 48. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a body defining a cabin and having first and second static pillars;
a door that accesses the cabin, secured to the body, and disposed between the first and second static pillars;
a glass dome secured to the body over the entirety of the cabin; and
dynamic pillars extendable in an upward direction and secured to the body proximate to an outer perimeter of the glass dome.

2. The vehicle of claim 1, wherein a first dynamic pillar is disposed within the first static pillar.

3. The vehicle of claim 2, wherein a second dynamic pillar is disposed within the second static pillar.

4. The vehicle of claim 3, wherein the body further comprises a third static pillar, a second door that accesses the cabin that is secured to the body and disposed between the second and third static pillars.

5. The vehicle of claim 4, wherein a third dynamic pillar is disposed within the second door.

6. The vehicle of claim 1 further comprising a gas generator configured to direct a gaseous material to the dynamic pillars in order to extend the dynamic pillars in the upward direction.

7. The vehicle of claim 1 further comprising a latching mechanism that secures the dynamic pillars in an extended position.

8. The vehicle of claim 1, wherein the dynamic pillars are comprised of a telescoping mechanism.

9. A vehicle comprising:
a body defining a cabin;
a glass dome secured to the body over the entirety of the cabin;
dynamic pillars extendable in an upward direction via an actuator and secured to the body proximate to an outer perimeter of the glass dome; and
a controller programmed to, in response to a trigger condition, activate the actuator to extend the dynamic pillars.

10. The vehicle of claim 9, wherein the trigger condition is a detected imminent roll over condition.

11. The vehicle of claim 10 further comprising an accelerometer that is configured to detect, and communicate to the controller, a lateral acceleration of the vehicle, and wherein the controller is programmed to, in response to a lateral acceleration exceeding a threshold that corresponds to the roll over condition, activate the actuator to extend the dynamic pillars.

12. The vehicle of claim 9, wherein the actuator is a gas generator configured to direct a gaseous material to the dynamic pillars in order to extend the dynamic pillars in the upward direction.

13. The vehicle of claim 9 further comprising a latching mechanism that secures the dynamic pillars in an extended position.

14. The vehicle of claim 9, wherein the dynamic pillars are comprised of a telescoping mechanism.

15. A vehicle comprising:
a body defining a cabin and having a set of static pillars;
a plurality of doors that accesses the cabin, secured to the body, and disposed between adjacent static pillars;
dynamic pillars disposed within at least one of the static pillars and extendable in an upward direction; and
a gas generator configured to direct a gaseous material to the dynamic pillars in order to extend the dynamic pillars in the upward direction.

16. The vehicle of claim 15 further comprising a glass dome secured to the body over the entirety of the cabin.

17. The vehicle of claim 16, wherein the glass dome is positioned such that the dynamic pillars are secured to the body proximate to an outer perimeter of the glass dome.

18. The vehicle of claim 15 further comprising a latching mechanism that secures the dynamic pillars in an extended position.

19. The vehicle of claim 15, wherein the dynamic pillars are comprised of a telescoping mechanism.

* * * * *